UNITED STATES PATENT OFFICE.

CARL STRAUB, OF SYRACUSE, NEW YORK, ASSIGNOR TO THE ADAMANT MANUFACTURING COMPANY, OF SAME PLACE.

COMPOSITION OF MATTER FOR ARCHITECTURAL PURPOSES.

SPECIFICATION forming part of Letters Patent No. 395,091, dated December 25, 1888.

Application filed September 22, 1888. Serial No. 286,124. (No specimens.)

*To all whom it may concern:*

Be it known that I, CARL STRAUB, of Syracuse, in the county of Onondaga, in the State of New York, have invented new and useful Improvements in Composition of Matter for Architectural Purposes, of which the following is a full, clear, and exact description.

My present invention relates to the composition of matter described in my application for Letters Patent Serial No. 276,971, filed June 13, 1888; and it consists in the addition to the said compound of other ingredients, as hereinafter specified, for the purpose of specially adapting the compound for plastering the walls and ceilings of buildings.

In preparing my present compound I dissolve glue or gelatinous matter, of either vegetable or animal source, in water, and to about eight pounds of this solution I add about sixteen pounds of oil or fat or saccharine or hydrocarbon compound, or its acids or salts. After the aforesaid ingredients have been thoroughly mixed, I add thereto about twenty-two pounds of muriatic acid and about five pounds of sulphuric acid, and then heat the mixture to about 450° and thoroughly mix the same by stirring it, and then allow it to stand about three days and cool it, and during that time I occasionally stir it. At the end of this period I add about sixteen and one-half parts of water to about one part of the mixture, and then sift into it one part of pulverized calcined sulphate of lime to about one-twentieth part of pulverized calcined carbonate of lime, and then allow the mass to dry. When thoroughly dried, I pulverize the same, and then add thereto sixteen parts of sulphate of lime and from three to twelve parts of sand or comminuted mineral of calcareous base to one part of the aforesaid pulverized dry compound. To the mass thus formed I add magnesia, (carbonate of magnesia—calcined—or silicate of magnesia,) or, in the form of steatite, talc or mica in proportion of about one-fifth of the magnesia or its said equivalents to four-fifths of the aforesaid mass.

What I claim is—

The within-described composition of matter, consisting of magnesia mixed with glue or gelatinous matter, hydrocarbon compound, acid, pulverized calcined material, and sand or comminuted mineral of calcareous base, substantially as set forth.

In testimony whereof I have hereunto signed my name, in the presence of two witnesses, at Syracuse, in the county of Onondaga, in the State of New York, this 20th day of September, 1888.

CARL STRAUB. [L. S.]

Witnesses:
C. H. DUELL,
J. J. LAASS.